US008939658B2

(12) United States Patent
Heimbuch et al.

(10) Patent No.: US 8,939,658 B2
(45) Date of Patent: Jan. 27, 2015

(54) SMALL FORM-FACTOR PLUGGABLE OPTICAL TRANSCEIVER

(71) Applicants: Mark Heimbuch, Chatsworth, CA (US); Wayne Wainwright, Ventura, CA (US)

(72) Inventors: Mark Heimbuch, Chatsworth, CA (US); Wayne Wainwright, Ventura, CA (US)

(73) Assignee: Source Photonics, Inc., Chatsworth, CA (US)

( * ) Notice: Subject to any disclaimer, the term of this patent is extended or adjusted under 35 U.S.C. 154(b) by 0 days.

(21) Appl. No.: 13/752,747

(22) Filed: Jan. 29, 2013

(65) Prior Publication Data

US 2014/0140666 A1 May 22, 2014

(30) Foreign Application Priority Data

Nov. 20, 2012 (CN) .......................... 2012 1 0471478

(51) Int. Cl.
  *G02B 6/36* (2006.01)
  *G02B 6/42* (2006.01)
(52) U.S. Cl.
  CPC ................ *G02B 6/4273* (2013.01); *G02B 6/36* (2013.01); *G02B 6/4246* (2013.01); *G02B 6/4292* (2013.01)
  USPC .............................................. 385/92; 385/88
(58) Field of Classification Search
  CPC . H01S 5/02415; H01S 5/02248; H01S 5/024; G02B 6/43; G02B 6/02204; B01L 2300/1822; G02F 1/0147
  USPC ................................ 385/88–92, 135; 29/428
  See application file for complete search history.

(56) References Cited

U.S. PATENT DOCUMENTS

| 6,997,622 | B2 * | 2/2006 | Dodds et al. ..................... 385/92 |
| 7,637,672 | B1 * | 12/2009 | Li et al. ............................ 385/92 |
| 8,391,667 | B2 * | 3/2013 | Teo et al. ....................... 385/139 |
| 8,485,739 | B2 * | 7/2013 | Yi et al. .......................... 385/92 |
| 2003/0044131 | A1 * | 3/2003 | Stewart et al. ................... 385/92 |
| 2004/0161207 | A1 * | 8/2004 | Chiu et al. ...................... 385/88 |
| 2005/0041933 | A1 * | 2/2005 | Meadowcroft et al. ......... 385/92 |
| 2008/0063342 | A1 * | 3/2008 | Ono et al. ....................... 385/88 |

(Continued)

FOREIGN PATENT DOCUMENTS

| CN | 101726807 A | 6/2010 |
| CN | 201508426 U | 6/2010 |
| CN | 102323647 A | 1/2012 |

OTHER PUBLICATIONS

Abstract for CN 201508426; http://worldwide.espacenet.com; Jun. 16, 2010.

(Continued)

*Primary Examiner* — Ellen Kim
(74) *Attorney, Agent, or Firm* — Andrew D. Fortney; Central California IP Group, P.C.

(57) ABSTRACT

A small form-factor pluggable (SFP) optical transceiver includes a casing configured to accommodate optical and electrical devices. During normal operation, the casing is connected to a switchboard via a connector in the switchboard, and the optical devices are outside the switchboard, thereby exposing optical devices sensitive to high temperature to the outside air, reducing the operational temperature of the optical device portion relative to the heated portion inside the switchboard. Thus, the present SFP optical transceiver advantageously improves operational performance and extends the life of the device. Also, the present SFP optical transceiver having the optical device portion outside the switchboard advantageously improves the cooling performance for the optical device portion.

19 Claims, 5 Drawing Sheets

(56) References Cited

U.S. PATENT DOCUMENTS

| | | | |
|---|---|---|---|
| 2009/0000809 A1* | 1/2009 | Yagisawa et al. | 174/254 |
| 2009/0232173 A1* | 9/2009 | Nakagawa | 372/34 |
| 2011/0080008 A1* | 4/2011 | Teo et al. | 292/197 |
| 2014/0056592 A1* | 2/2014 | McColloch et al. | 398/135 |

OTHER PUBLICATIONS

Abstract for CN 102323647; http://worldwide.espacenet.com; Jan. 18, 2012.

Abstract for CN 101726807; http://worldwide.espacenet.com; Jun. 9, 2010.

\* cited by examiner

SMALL FORM-FACTOR PLUGGABLE OPTICAL TRANSCEIVER

CROSS REFERENCE TO RELATED APPLICATION

This application claims the benefit of Chinese Patent Application No. 201210471478.3, filed on Nov. 20, 2012, which is incorporated herein by reference as if fully set forth herein.

FIELD OF THE INVENTION

The present invention generally relates to the field of optoelectronic communications and devices therefor, and particularly to an optical transceiver. More specifically, embodiments of the present invention pertain to a small form-factor pluggable (SFP) optical transceiver, particularly circuits, devices, and method(s) of making and/or using the same.

DISCUSSION OF THE BACKGROUND

A small form-factor pluggable (SFP) optical transceiver, generally defined by an applicable MSA standard, provides bidirectional data transmission in optical communications. Generally, a conventional SFP optical transceiver comprises (i) a casing, (ii) electrical devices, such as printed circuit boards (PCB), chips, etc., and (iii) optical devices, such as a transceiver optical subassembly (TOSA) and a receiver optical subassembly (ROSA) placed inside the casing. The conventional SFP optical transceiver is inserted during normal operation into a switchboard cage having corresponding SFP connectors. When the SFP optical transceiver goes into the cage, the electrical and optical devices enter into the cage in order, respectively, and are subsequently latched into place by a latching mechanism.

With regard to SFP optical transceivers, optical and electrical devices require different operating temperatures. Relative to electrical devices, operating temperatures have a greater influence on the performance of optical devices. As result, various SFP optical transceivers, thermistors, temperature sensors and other devices are configured to avoid a reduction in the performance of the optical device when the operating temperature increases. However, overheating of the optical device cannot be eliminated. Generally, overheating of the optical device occurs after connecting the SFP optical transceiver to the switchboard, since the electrical and optical devices of the SFP optical transceiver are completely enclosed in the switchboard. The switchboard and the electrical devices of the SFP optical transceiver emit a significant amount of heat during normal operation, creating a relatively hot environment within the device, thereby resulting in relatively low efficiency and a decrease in the life of the device.

As optical and electrical devices are placed in one cavity in the conventional SFP optical transceiver, high heat close to the electrical device could easily transfer to the optical device, negatively affecting the performance and the life of the optical device, This "Discussion of the Background" section is provided for background. information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a SFP optical transceiver having better performance and extended device life that overcomes the above-mentioned shortcomings in conventional optical transceivers. To implement the objective(s) of the present invention, technical proposals are provided below.

The present invention provides a SFP optical transceiver, comprising a casing configured to accommodate optical and electrical devices. During normal operation, the casing is connected to a switchboard via a connector in the switchboard. Alternatively, during normal operation, the optical devices may be outside of the switchboard.

Preferably, the casing has an internal isolator configured to divide the casing into a first cavity to accommodate the optical devices and a second cavity to accommodate the electrical devices. As a result, the relatively high heat produced by the electrical device portion during normal operation may be reduced or eliminated from being transferred to the cavity where the optical devices are located. As a result, the operating temperatures of the optical devices are reduced.

Alternatively, during normal operation, the first cavity is located outside the switchboard, and the second cavity is located inside the switchboard. In this configuration, the effect of the high temperature inside the switchboard on the first cavity containing the optical devices can be minimized during normal operation. Thereby, the heat produced by the electrical device portion may be prevented from being transferred to the internal portion of the first cavity. in addition, the heat outside the casing and/or inside the switchboard affecting the operating temperature of the optical device may be prevented. Furthermore, the operating temperature of the optical device may be kept at a relatively low level, thereby increasing the life and efficiency of the optical device.

In various embodiments of the present invention, a thermal isolator has an electrical feed that electrically connects one side of the thermal isolator close to and/or adjacent to the first cavity with another (e.g., opposite) side of the thermal isolator close to and/or adjacent to the second cavity. Preferably, the thermal isolator may be or comprise a ceramic or other thermally insulating material that can function as a (thermal) barrier.

In various embodiments of the present invention, air holes are located in the cover and base of the casing corresponding to the first cavity. The air holes run through the casing and communicate the first cavity with the outside of the casing. In this structure, heat in the first cavity containing the optical devices can be exchanged with the air outside the device more effectively. Preferably, the air holes are arranged in the cover and the base of the casing in predetermined positions or locations. In this structure, heat in the first cavity can be exchanged with the air outside the device steadily and effectively.

In further embodiments of the present invention, a bottom surface (e.g., face) of the casing has a tapered end, and the isolator has a groove compatible (e.g., configured to mate) with the tapered end. The connection between the isolator and the casing is implemented by the tapered end fitting or mating with the groove, resulting in efficient heat insulation.

Preferably, the casing has a de-latching unit on a top surface (e.g., face) of the casing. The de-latching unit is configured to latch the casing in the switchboard. Alternatively, the de-latching unit releases the casing from the switchboard.

Thus, the present invention relates to a two-cavity SFP optical transceiver module that can operate at two different temperatures in different regions of the module. Generally, the ambient temperature outside of the module, switch or switchboard is less than 55° C., but the temperature inside the module, switch or switchboard may exceed 75° C. The temperature of the extended nose (e.g., the tapered end or optical cavity of the transceiver) is the case temperature of the switch or switchboard, with which the optical subassembly (OSA) inside the optical cavity will be in thermal equilibrium. In addition, the temperature of the extended nose will be cooler than the temperature of the electrical (or back) portion of the transceiver, which is the temperature of the electronic parts inside the SFP casing. The present invention advantageously provides a two-part casing structure that can operate at different temperatures, having an extended nose (e.g., tapered end) and two operating temperature zones. Generally, higher port densities may increase thermal issues inside the system (e.g., a switch). The optical portion of the present transceivers should stay at a temperature ≤85° C. Lower OSA temperatures advantageously provide improved yields, lower operational costs, and/or better performance.

Relative to the conventional devices described above, the present invention advantageously locates optical devices that are sensitive to operational temperature outside the switchboard or system case. Relative to accommodating the operational temperature of the optical devices when heated inside the switchboard, a reduction in the operational temperature of the optical device portion of the transceiver improves operational performance and extends the life of the device. Also, placing the optical device portion outside the switchboard advantageously improves the cooling of the optical devices.

These and other advantages of the present invention will become readily apparent from the detailed description of various embodiments below.

DETAILED DESCRIPTION

Reference will now be made in detail to various embodiments of the invention, examples of which are illustrated in the accompanying drawing(s). In order to achieve the objectives, technical solutions and advantages of the present invention more clearly, further details of the invention are described below with regard to the Figure(s). While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiment 1

Figure 1:
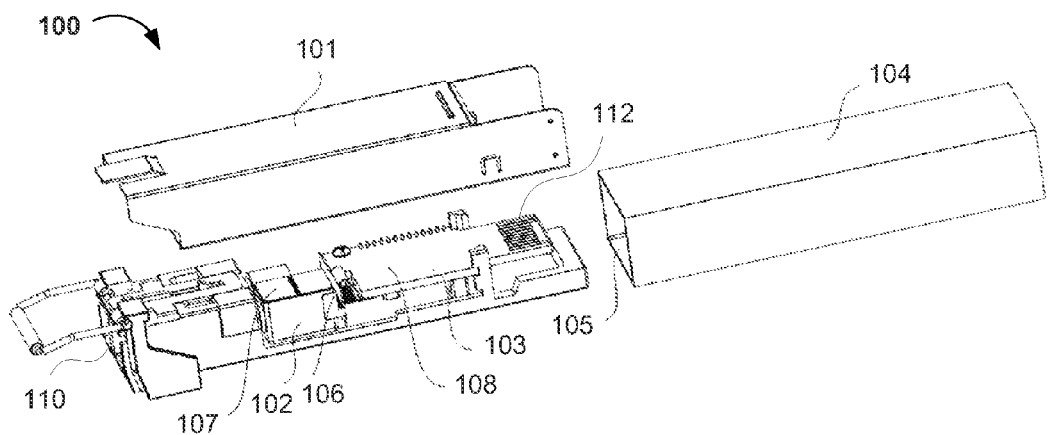
FIG. 1 is a diagram showing an internal structure of an exemplary optical transceiver and a casing in accordance with the present invention.

As shown in FIG. 1, a small form-factor pluggable (SFP) optical transceiver 100 comprises a casing 101 having an optical port 110 and an electrical port 112. The casing 101 is configured to accommodate optical devices 102 and electrical devices 103. The optical device 102 comprises a transceiver optical subassembly (TOSA) and a receiver optical subassembly (ROSA). The electrical devices 103 are located on a printed circuit board (PCB) on or near the bottom of the casing 101.

Figure 2:
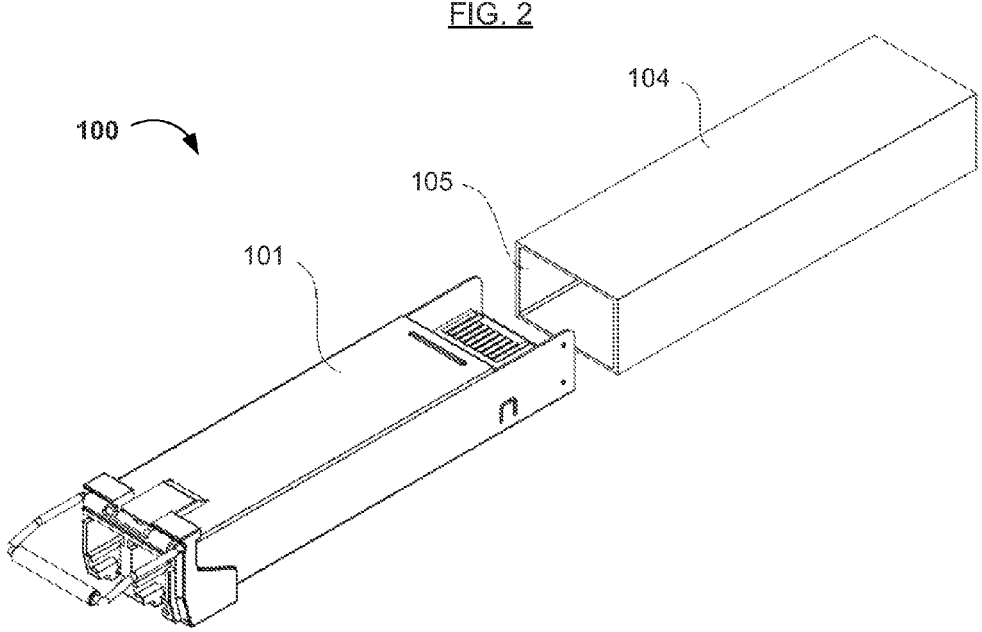
FIG. 2 is a diagram showing the optical transceiver before it is inserted into a switchboard in accordance with the present invention.
Figure 3:
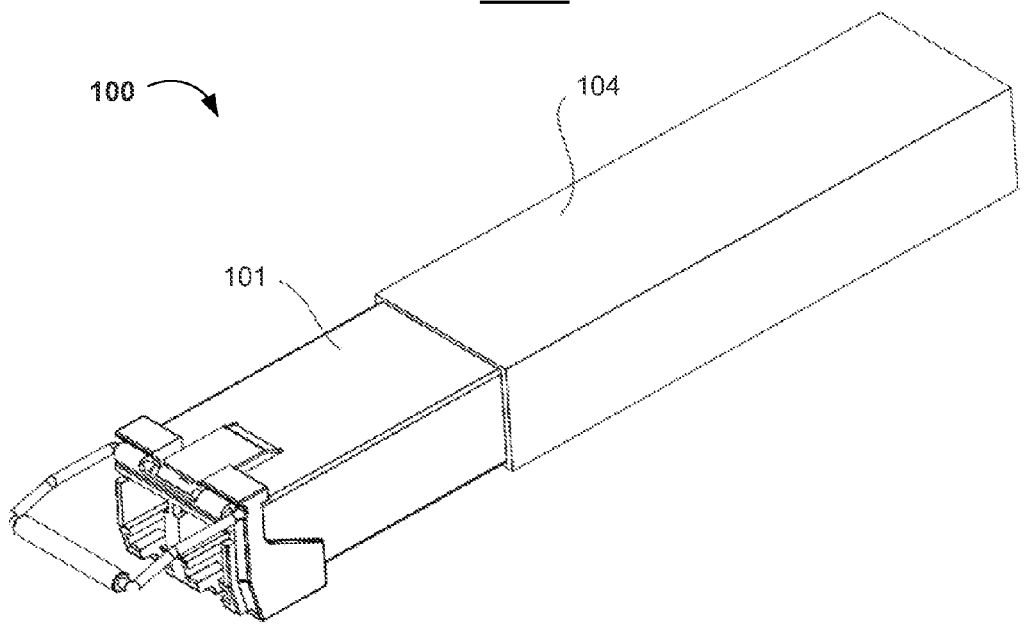
FIG. 3 is a diagram showing the structure after the optical transceiver is inserted into a switchboard.
Figure 4:
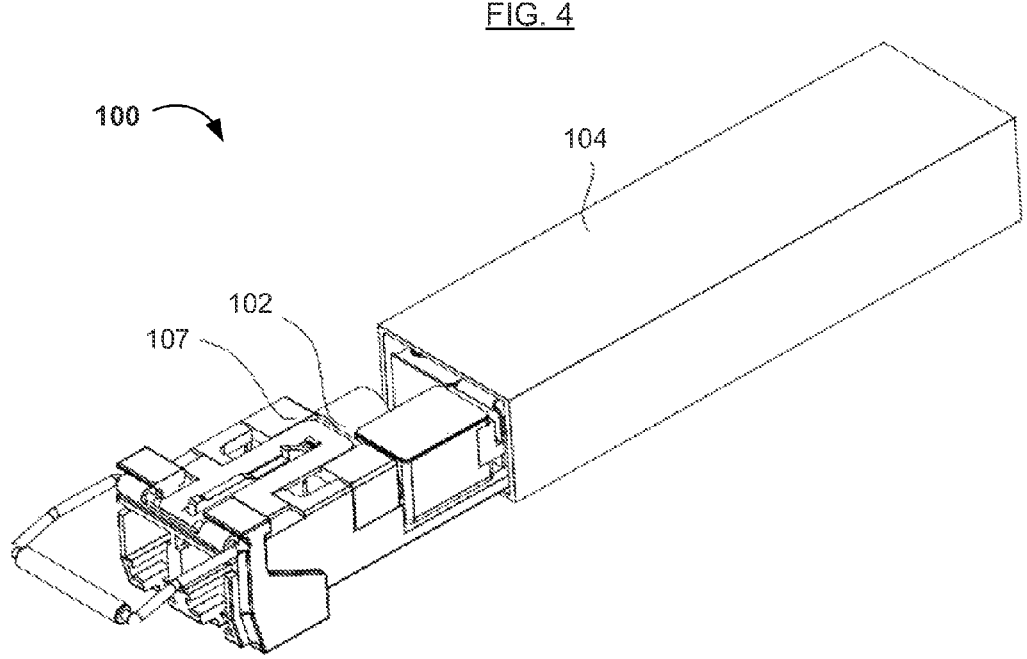
FIG. 4 is an internal structure diagram of an exemplar optical transceiver after being inserted into a switchboard.

As shown in FIGS. 2-4, during normal operation, the casing 101 is connected to a switchboard 104 via a connector 105 located in the switchboard 104. As shown more clearly in FIG. 3, one portion of the casing 101 stays outside of the switchboard 104 after the casing 101 is inserted into the connector 105 located in the switchboard 104. More specifically, the electrical devices 103 inside the casing 101 and the portion of the casing 101 enclosing the electrical devices 103 stay inside the switchboard 104, and the portion of the optical devices 102 stays outside the switchboard 104 (see, e.g., FIG. 4, in which the portion of casing 101 outside the switchboard 104 has been removed). Thus, the optical devices 102 inside the casing and the portion of the casing 101 enclosing the optical devices 102 stay outside the switchboard 104. As a result, optical devices 102 sensitive to the operational temperature may be kept outside the switchboard 104 to reduce the operational temperature of optical devices 102, relative to the heated portion inside the switchboard 104. Thus, the optical transceiver of the present invention advantageously improves operational performance and extends the life of the device. Furthermore, placing the portion of the optical devices 102 outside the switchboard 104 improves the cooling performance of the optical devices 102.

Conventionally, the ambient temperature outside of the switchboard 104 that the SFP optical transceiver goes into is less than 55° C., and the temperature inside the switchboard 104 may exceed 75° C. However, the optical devices 102 may completely cool down and provide a consistent low operating temperature in accordance with Embodiment 1 of the present invention.

Embodiment 2

Figure 5:
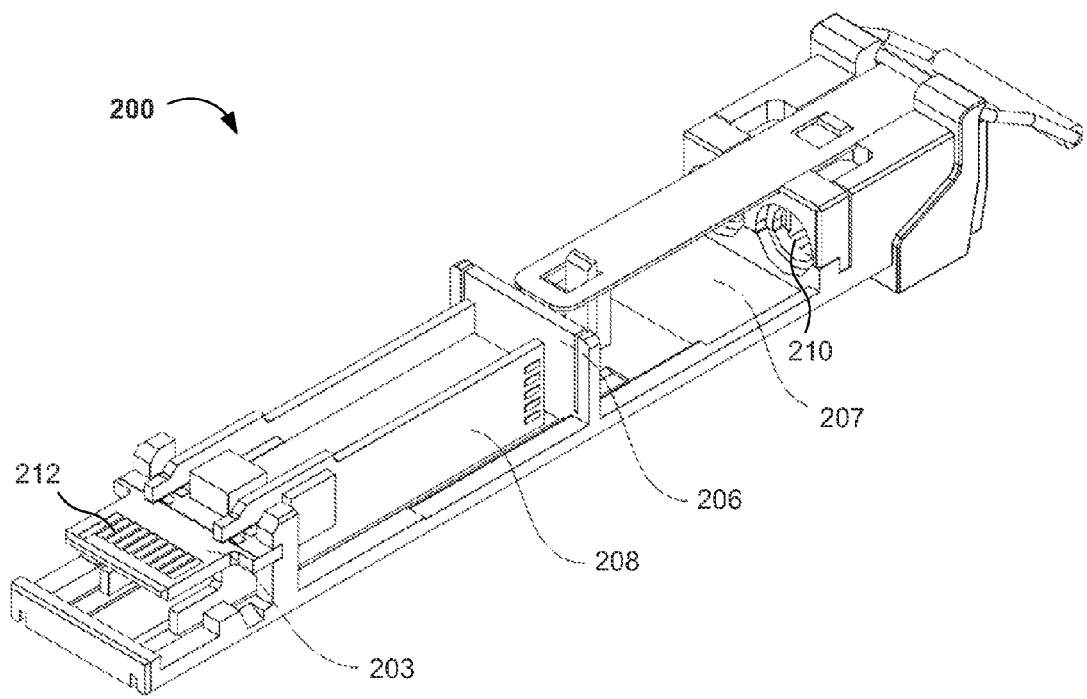
FIG. 5 is an internal structure diagram showing one embodiment of the optical transceiver in accordance with the present invention.
Figure 6:
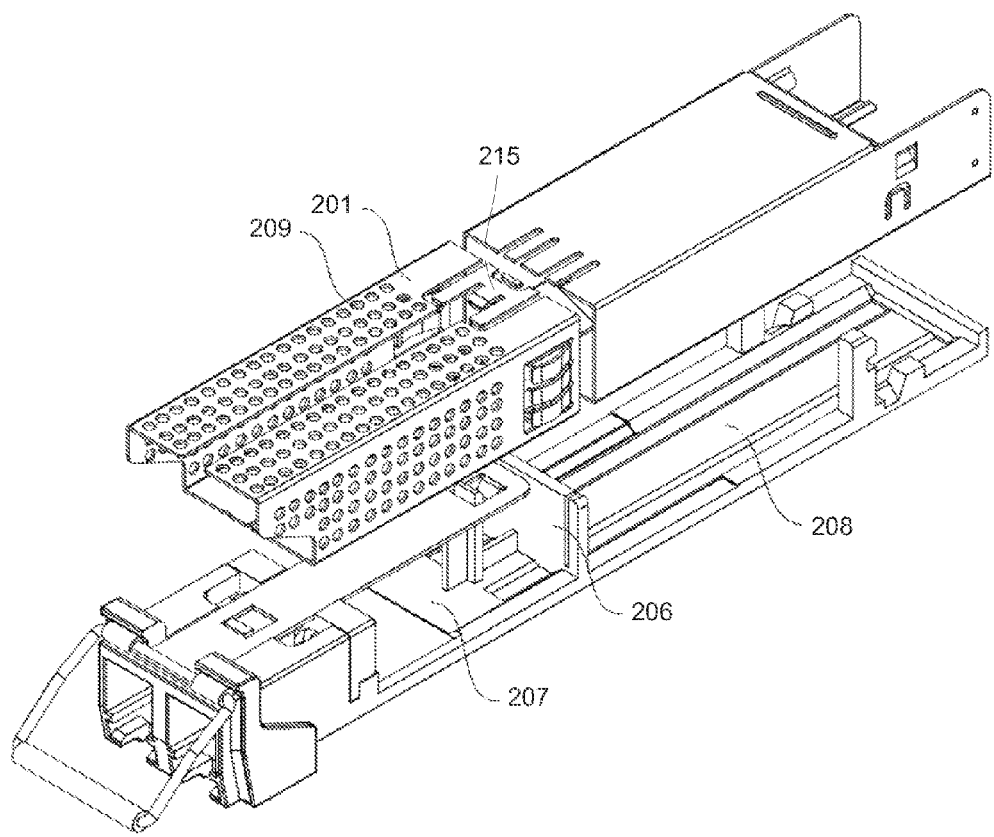
FIG. 6 is a structure diagram showing the optical transceiver of FIG. 5 with an exemplary casing in accordance with the present invention, prior to being positioned in a switchboard.

As shown in FIGS. 5 and 6, based on or from Embodiment 1 above, an SFP optical transceiver 200 (or a casing 201 therefor) has a built-in (e.g., internal) isolator 206. The isolator 206 is configured to divide the transceiver 200 (or casing 201) into a first cavity 207 close to or facing the optical port 210 and a second cavity 208 close to or facing the electrical port 212. The optical devices (not shown) are located in the first cavity 207, and the electrical devices (not shown) are located in the second cavity 208. After the transceiver 200 (or casing 201) is divided into two relatively independent cavities via the isolator 206, the portion 208 containing the electrical devices having a relatively high temperature is isolated from the portion 207 containing the optical devices. Heat produced by the electrical device portion 203 having a high temperature during normal operation can be blocked from being transferred to the cavity 207 where the optical devices are located, resulting in a relatively low operating temperature. Consequently, the operating temperature of the optical devices is reduced.

In this embodiment, the thermal isolator 206 may comprise a ceramic material. The thermal isolator 206 has electrical feed therein to electrically connect one side of the thermal isolator 206 close to or facing the first cavity 207 with an opposite side of the thermal isolator 206 close to or facing the second cavity 208, thereby creating an electrical connection between the optical devices and the electrical devices.

Furthermore, in Embodiment 2, the isolator 206 is directly set inside the casing 201. In further embodiments of the present invention, the isolator 206 may be removable, dismountable or set inside the casing 201 in various ways, and configured to divide the internal portion of the casing 201 into two relatively independent cavities 207 and 208.

Figure 7:
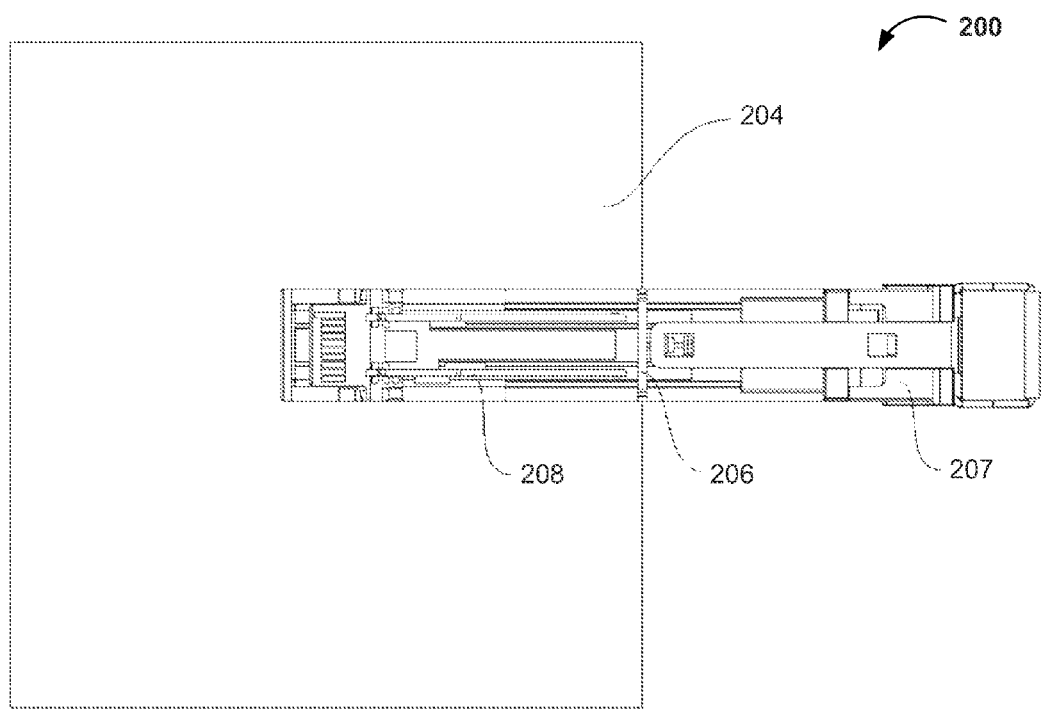
FIG. 7 is a top view of the optical transceiver of FIG. 6 in a switchboard, without the casing.

As shown in FIG. 7, during normal operation, the first cavity 207 is located outside the switchboard 204, and the second cavity 208 is located inside the switchboard 204. Thus, the effect of the high temperature inside the switchboard 204 on the first cavity 207 containing the optical devices can be minimized during normal operation. Thus, the heat produced by the electrical devices inside cavity 208 may be prevented from transferring to the internal portion of the first cavity 207, and the heat outside the casing 201 and/or inside the switchboard 204 may not influence the operating temperature of the optical devices. Furthermore, the operating temperature of the optical devices may be kept at a relatively low level, thereby increasing the life and efficiency of the optical device 202.

The other structures of this embodiment (e.g., Embodiment 2) have been explained in greater detail with respect to Embodiment 1.

Embodiment 3

Referring back to FIGS. 1 and 4, Embodiment 3 is different from directly setting the isolator 106 inside the casing 101, as described in Embodiment 2 above. In this embodiment (e.g., Embodiment 3), the isolator 106 and the casing 101 may be connected by a latching mechanism. More specifically, a bottom surface (e.g., face) of the casing 101 may have a tapered end, and the isolator 106 may have a groove compatible with the tapered end. The connection between the isolator 106 and the casing 101 is implemented by the tapered end effectively working or mating with the groove. Consequently, the optical device portion 102 may be easily removed or dismounted, and the connection between the optical devices 102 and the electrical devices 103 may be enhanced.

The other structures of this embodiment (e.g., Embodiment 3) have been explained in greater detail with respect to Embodiments 1 and 2.

Embodiment 4

The casing 201 of Embodiment 4, as shown in FIG. 6 for an SFP optical transceiver 200 is similar to other various casings.

Referring to FIG. 6, the casing 201 of FIG. 6 has a de-latching unit 215 on a top surface (e.g., face), in which the de-latching unit 215 is configured to latch the casing 201 (of FIG. 6) and the switchboard 204. Alternatively, the de-latching unit 215 releases the casing 201 (of FIG. 6) from the switchboard 204. In Embodiment 4, the de-latching unit 215 is located over or on top of the second cavity 208. When the second cavity 208 is inserted into the switchboard 204 and the first cavity 207 remains outside the switchboard, the casing 201 and the switchboard 204 are steadily connected.

In addition to keeping the first cavity 207 outside the switchboard 204, air holes 209 are located in the cover and base of the casing 201 (of FIG. 6) corresponding to the first cavity 207 to further increase heat dissipation efficiency. The air holes 209 run through the casing 201 and are arranged at predetermined locations throughout the cover and case 201 (e.g., in an array). Heat exchange between the first cavity 207 and the outside air can be implemented via the air holes 209, thereby maintaining the internal operating temperature of the first cavity 207.

The other structures of this embodiment (e.g., Embodiment 4) have been explained in greater detail with respect to Embodiments 1-3 above.

Conclusion/Summary

Thus, the present invention provides a SFP optical transceiver and method(s) of making and/or using the same. The SFP optical transceiver comprises, a casing configured to accommodate optical and electrical devices. During normal operation, the casing is connected to a switchboard via a connector in the switchboard, and the optical devices are outside the switchboard, thereby exposing optical devices that are typically sensitive to high temperature to the air outside the device, reducing the operational temperature of the optical device portion relative to the heated portion inside the switchboard, to accommodate the optical devices and their sensitivity to high operating temperatures.

Thus, the present SFP optical transceiver advantageously improves operational performance and extends the life of the device. Also, the present SFP optical transceiver having the optical device portion outside the switchboard advantageously improves the cooling performance for the optical device portion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching(s). The embodiments were chosen and described in order to best explain the principles of the invention and its practical application(s), to thereby enable others skilled in the art to best utilize the invention and various embodiments with various modifications as are suited to the particular use contemplated. It is intended that the scope of the invention be defined by the claims appended hereto and their equivalents.

What is claimed is:

1. A small form-factor pluggable optical transceiver, comprising:
   a switchboard having a connector; and
   a casing connected to said switchboard via said connector, said casing configured to accommodate optical devices and electrical devices and comprising an internal thermal isolator configured to divide the casing into a first cavity that contains said optical devices and a second cavity that contains said electrical devices, wherein said casing is configured to position said optical devices outside said switchboard during normal operation.

2. The transceiver of claim 1, wherein said second cavity is positioned inside the switchboard.

3. The transceiver of claim 1, wherein the internal thermal isolator has an electrical feed therein to electrically connect one side of said internal thermal isolator close to said first cavity with another side of said internal thermal isolator close to said second cavity.

4. The transceiver of claim 1, wherein said internal thermal insulator comprises a ceramic material.

5. The transceiver of claim 1, wherein said casing comprises a cover and a base close and/or adjacent to said thermal isolator.

6. The transceiver of claim 5, wherein said casing includes air holes configured to communicate said second cavity with air outside said casing.

7. The transceiver of claim 1, wherein said casing has a tapered end at an inner bottom portion of said casing, and a bottom portion of said thermal isolator has a groove compatible with said tapered end.

8. The transceiver of claim 1, wherein said casing comprises a de-latching unit on a top surface of said casing.

9. The transceiver of claim 8, wherein said de-latching unit is configured to latch said casing and said switchboard, and release said casing from said switchboard.

10. A small form-factor pluggable optical transceiver, comprising:
    a first cavity having a plurality of optical devices therein;
    a second cavity having one or more electrical devices therein; and
    a casing enclosing the optical devices and the electrical devices, comprising an internal thermal isolator configured to divide the casing into the first cavity and the second cavity, and isolate or prevent heat from said electrical devices in said second cavity from transferring into said first cavity or affecting said optical devices in said first cavity, wherein said casing has a tapered end at an inner bottom portion of said casing, and a bottom portion of said thermal isolator has a groove compatible with said tapered end.

11. The transceiver of claim 10, wherein said first cavity is outside a switchboard or other system case during normal operation.

12. The transceiver of claim 10, further comprising a thermal isolator having an electrical feed therein to electrically connect one side of said thermal isolator close to or facing said first cavity with another side of said thermal isolator close to or facing said second cavity.

13. The transceiver of claim 12, wherein said thermal isolator comprises a thermal insulating layer or a ceramic material.

14. The transceiver of claim 10, wherein said casing includes air holes configured to communicate said second cavity with air outside said casing.

15. The transceiver of claim 10, wherein said casing comprises a de-latching unit on a top surface of said casing.

16. The transceiver of claim 1, wherein the first cavity is configured to operate at or be in thermal equilibrium with a case temperature of the switchboard.

17. The transceiver of claim 10, wherein the first cavity is configured to operate at a temperature at least 20° C. less than that of the second cavity.

18. The transceiver of claim 8, wherein the de-latching unit is located over or on top of the first cavity.

19. The transceiver of claim 15, wherein the de-latching unit is located over or on top of the first cavity.

* * * * *